United States Patent
Chen (10) Patent No.: US 12,141,020 B2
(45) Date of Patent: Nov. 12, 2024

(54) METHOD AND INTELLIGENT TERMINAL FOR PROCESSING TOUCH FAILURE AT POWER-ON OF TOUCH SCREEN

(71) Applicant: Huizhou TCL Cloud Internet Corporation Technology Co. Ltd., Guangdong (CN)

(72) Inventor: Ping Chen, Guangdong (CN)

(73) Assignee: Huizhou TCL Cloud Internet Corporation Technology Co. Ltd., Huizhou (CN)

( * ) Notice: Subject to any disclaimer, the term of this patent is extended or adjusted under 35 U.S.C. 154(b) by 0 days.

(21) Appl. No.: 18/555,766

(22) PCT Filed: Feb. 25, 2022

(86) PCT No.: PCT/CN2022/077942
§ 371 (c)(1),
(2) Date: Oct. 17, 2023

(87) PCT Pub. No.: WO2022/222603
PCT Pub. Date: Oct. 27, 2022

(65) Prior Publication Data
US 2024/0211329 A1  Jun. 27, 2024

(30) Foreign Application Priority Data
Apr. 19, 2021 (CN) .......................... 202110418316.2

(51) Int. Cl.
*G06F 3/041* (2006.01)
*G06F 1/3234* (2019.01)
*G06F 11/07* (2006.01)

(52) U.S. Cl.
CPC ...... *G06F 11/0751* (2013.01); *G06F 11/0793* (2013.01)

(58) Field of Classification Search
CPC .. G06F 11/0751; G06F 11/0793; G06F 3/041; G06F 1/3234; G06F 1/3262
(Continued)

(56) References Cited

U.S. PATENT DOCUMENTS

| 2014/0320426 A1* | 10/2014 | Baba ..................... G06F 3/0416 345/173 |
| 2019/0302957 A1* | 10/2019 | Nagira .................. G06F 1/3265 |

FOREIGN PATENT DOCUMENTS

| CN | 103699454 A | 4/2014 |
| CN | 104679349 A | 6/2015 |

(Continued)

OTHER PUBLICATIONS

International Search Report in International application No. PCT/CN2022/077942, mailed on May 10, 2022.
(Continued)

*Primary Examiner* — Jude Jean Gilles
(74) *Attorney, Agent, or Firm* — Menachem Nathan; Nathan & Associates (57) ABSTRACT

Disclosed are a method, a system, and an intelligent terminal of processing the touch failure of the touch screen after it is powered on. The method includes: powering on the touch screen by a main board; reading an ID pin of the touch screen by a main control chip upon detecting a touch operation of the user clicking the touch screen; downloading software firmware by the main control chip to the chip of the touch screen through an IIC; determining, by the main control chip, whether interruption or an IIC signal of the touch screen is normal by the main control chip; if the interruption of the touch screen is normal, performing a power-on operation by the main control chip; and if the IIC signal of the touch screen is normal, performing a power-on operation by the main control chip.

20 Claims, 3 Drawing Sheets

(58) Field of Classification Search
USPC .......................................................... 709/201
See application file for complete search history.

(56) References Cited

FOREIGN PATENT DOCUMENTS

| | | |
|---|---|---|
| CN | 105718281 A | 6/2016 |
| CN | 105739767 A | 7/2016 |
| CN | 108833687 A | 11/2018 |
| CN | 109582506 A | 4/2019 |
| CN | 113110758 A | 7/2021 |
| WO | 2015123932 A1 | 8/2015 |

OTHER PUBLICATIONS

Written Opinion of the International Search Authority in International application No. PCT/CN2022/077942, mailed on May 10, 2022.
Chinese Office Action issued in corresponding Chinese Patent Application No. 202110418316.2 dated May 7, 2022, pp. 1-6.

\* cited by examiner

METHOD AND INTELLIGENT TERMINAL FOR PROCESSING TOUCH FAILURE AT POWER-ON OF TOUCH SCREEN

CROSS REFERENCE TO RELATED APPLICATIONS

The PCT patent disclosure claims priority to Chinese Patent Application No. 202110418316.2, filed on Apr. 19, 2021, which is incorporated herein by reference.

TECHNICAL FIELD

The present disclosure relates to a field of touchpads, and more particularly, to a method, an intelligent terminal, and a computer readable storage medium for processing touch failure at power-on of a touch screen.

BACKGROUND

A touchpad (or trackpad) is an input device widely applied to a notebook computer, and controls movement of a pointer by sensing movement of a finger of a user. The touchpad may be viewed as an alternative to a mouse. The touchpad may also be found in other portable devices, such as a personal digital assistant and some portable audio-visual devices. Due to design constraints, the touchpad is typically no more than 20 square centimeters for gesture such as zooming in and out of a display screen and for hand-written input purposes. The touchpad has printed circuit boards in an array of rows and columns. The printed circuit board and a surface plastic film are bonded by a strong double-sided adhesive, and the touchpad is inductively detected by capacitance sensing. A special integrated circuit board under a lower surface of the touchpad is configured to continuously measure and report the trace of the finger to detect the motion and the position of the finger.

The touchpad is an input intelligent terminal capable of moving a cursor on a smooth touchpad by a sliding operation of a finger, so that the beginner can be easily used. Because the touchpad is very thin, it is possible to design an ultra-thin notebook computer, or a keyboard. In addition, it is not a mechanical design, and it is very easy to maintain. It operates in such a way that when the user's finger approaches the touchpad, the capacitance changes, and a control IC of the touchpad detects the change in the capacitance and converts the change into a coordinate position. The touchpad senses the movement of the finger by capacitance and is insensitive to finger heat. When the finger contacts the touchpad, the electrostatic field on the touchpad changes. The touchpad sensor is a finger track conduction line printed on the surface of the touchpad.

Electronic devices such as smartphones and tablets in the market often suffer from an unexplained problem of touch failure at power-on of the electronic devices. Some of the electronic devices suffer from the above problem due to damage of the touch screen hardware and in this case, the problem cannot be addressed. Some of the electronic devices suffer from the above problem due to low-probability software problem, e.g., touch is failure at startup of the electronic devices but becomes normal after the electronic devices is restarted, which causes very poor user experience and inconvenience to the user.

Therefore, the current technology still needs to be improved and developed.

SUMMARY

The present disclosure is intended to provide a method, a system, an intelligent terminal, and a computer readable storage medium for processing touch failure at power-on of a touch screen, aiming to improve the touch failure after the power-on of the touch screen, i.e., a problem that touch is failure after startup of the electronic devices but becomes normal after the electronic devices is restarted.

In view of above, a method of processing touch failure of a touch screen at power-on of touch screen is provided, and the method includes:
powering on the touch screen is by a main board;
reading an ID pin of the touch screen by a main control chip upon detecting a touch operation of the user clicking the touch screen;
downloading software firmware by the main control chip to the chip of the touch screen through an IIC;
determining, by the main control chip, whether interruption of the touch screen is normal and determining, by the main control chip, whether an IIC signal of the touch screen is normal by the main control chip;
in response to determine that the interruption of the touch screen is normal, performing a power-on operation by the main control chip; and
in response to determine that the IIC signal of the touch screen is normal, performing a power-on operation by the main control chip.

Alternatively, the method further includes: after determining, by the main control chip, whether the interruption of the touch screen is normal,
in response to determine that the interruption of the touch screen is abnormal, the main control chip performs a restart command.

Alternatively, the method further includes: after determining, by the main control chip, whether the IIC signal of the touch screen is normal,
in response to determine that the IIC signal of the touch screen is abnormal, the main control chip performs a restart command.

Alternatively, the method further includes:
in response to determine that the interruption of the touch screen is abnormal, the number of times the main control chip executes the restart command is a preset value.

Alternatively, the method further includes:
in response to determine that the IIC signal of the touch screen is abnormal, the number of times the main control chip executes the restart command is a preset value.

Alternatively, the preset value is one to two.

In view of above, a system of processing touch failure of a touch screen at power-on of the touch screen is provided, and the system includes:
a power-up module configured for a main board to power on the touch screen;
a read module configured for a main control chip to read an ID pin of the touch screen upon detecting a touch operation of the user clicking the touch screen;
a download module configured for the main control chip to download software firmware to the chip of the touch screen through an IIC;
a judge module configured for the main control chip to determine whether interruption of the touch screen is normal, and determines whether an IIC signal of the touch screen is normal;
a first processing module configured for the main control chip to perform a power-on operation in response to determining that the interruption of the touch screen is normal;

a second processing module configured for the main control chip to perform a restart operation in response to determining that the interruption of the touch screen is abnormal;

a third processing module configured for the main control chip to perform a power-on operation in response to determining that the IIC signal of the touch screen is normal; and a fourth processing module configured for the main control chip to perform a restart operation in response to determining that the IIC signal of the touch screen is abnormal.

In view of above, provided is an intelligent terminal including a memory, a processor, and processing program for processing touch failure of a touch screen at power-on of the touch screen stored on the memory and run on the processor, and the processing program is executed by the processor to perform operations including:

powering on the touch screen is by a main board;

reading an ID pin of the touch screen by a main control chip upon detecting a touch operation of the user clicking the touch screen;

downloading software firmware by the main control chip to the chip of the touch screen through an IIC;

determining, by the main control chip, whether interruption of the touch screen is normal and determining, by the main control chip, whether an IIC signal of the touch screen is normal by the main control chip;

in response to determine that the interruption of the touch screen is normal, performing a power-on operation by the main control chip; and in response to determine that the IIC signal of the touch screen is normal, performing a power-on operation by the main control chip.

Alternatively, the processing program is executed by the processor to perform operations further including: after determining, by the main control chip, whether the interruption of the touch screen is normal, in response to determine that the interruption of the touch screen is abnormal, the main control chip performs a restart command.

Alternatively, the processing program is executed by the processor to perform operations further including: after determining, by the main control chip, whether the IIC signal of the touch screen is normal, in response to determine that the IIC signal of the touch screen is abnormal, the main control chip performs a restart command.

Alternatively, the processing program is executed by the processor to perform operations further including:

in response to determine that the interruption of the touch screen is abnormal, the number of times the main control chip executes the restart command is a preset value.

Alternatively, the processing program is executed by the processor to perform operations further including:

in response to determine that the IIC signal of the touch screen is abnormal, the number of times the main control chip executes the restart command is a preset value.

Alternatively, the processing program is executed by the processor to perform operations further including:

in response to determine that the interruption of the touch screen is abnormal or in response to determine that the IIC signal of the touch screen is abnormal, reminding the user that the touch screen is inactive, prompting, by a pop-up box, the user whether to restart, and performing operations according to the user's operation instructions.

In view of above, provided is a computer readable storage medium having stored thereon a computer program for processing the touch failure of the touch screen at power-on of the touch screen executable by a processor, to perform operations further including:

powering on the touch screen is by a main board;

reading an ID pin of the touch screen by a main control chip upon detecting a touch operation of the user clicking the touch screen;

downloading software firmware by the main control chip to the chip of the touch screen through an IIC;

determining, by the main control chip, whether interruption of the touch screen is normal and determining, by the main control chip, whether an IIC signal of the touch screen is normal by the main control chip;

in response to determine that the interruption of the touch screen is normal, performing a power-on operation by the main control chip; and in response to determine that the IIC signal of the touch screen is normal, performing a power-on operation by the main control chip.

Alternatively, the processing program is executed by the processor to perform operations further including: after determining, by the main control chip, whether the interruption of the touch screen is normal, in response to determine that the interruption of the touch screen is abnormal, the main control chip performs a restart command.

Alternatively, the processing program is executed by the processor to perform operations further including: after determining, by the main control chip, whether the IIC signal of the touch screen is normal, in response to determine that the IIC signal of the touch screen is abnormal, the main control chip performs a restart command.

Alternatively, the processing program is executed by the processor to perform operations further including:

in response to determine that the interruption of the touch screen is abnormal, the number of times the main control chip executes the restart command is a preset value.

Alternatively, the processing program is executed by the processor to perform operations further including:

in response to determine that the IIC signal of the touch screen is abnormal, the number of times the main control chip executes the restart command is a preset value.

Alternatively, the processing program is executed by the processor to perform operations further including:

in response to determine that the interruption of the touch screen is abnormal or in response to determine that the IIC signal of the touch screen is abnormal, reminding the user that the touch screen is inactive, prompting, by a pop-up box, the user whether to restart, and performing operations according to the user's operation instructions.

In an embodiment of the present application, the touch screen is powered on by a main board; a main control chip reads an ID pin of the touch screen upon detecting a touch operation of the user clicking the touch screen; the main control chip downloads software firmware to a chip of the touch screen through an IIC; the main control chip determines whether interruption of the touch screen is normal, and determines whether an IIC signal of the touch screen is normal; in response to determining that the interruption of the touch screen is normal, the main control chip performs a power-on operation; in response to determining that the interruption of the touch screen is abnormal, the main control chip performs a restart command; in response to determining that the IIC signal of the touch screen is normal, the main control chip performs a power-on operation; and in response to determining that the IIC signal of the touch screen is abnormal, the main control chip performs a restart command. In an embodiment of the present disclosure, a touch screen interruption and a IIC signal are detected by the main control chip at power-on of the main control chip. In response to determining that the determination result is normal, the main control chip executes a power-on program, and in response to determining that the determination result is abnormal, the main control chip performs a power-on restart command, so that a low-probability power-on abnormality of the touch screen may be effectively avoided, and the touch failure at power-on of the touch screen caused by a touch screen interruption or a low-probability IIC abnormality is avoided.

DETAILED DESCRIPTION

In order that the objects, technical solutions, and advantages of the present disclosure may be made clearer and more explicit, the present disclosure will be described in further detail below with reference to the accompanying drawings and embodiments. It is to be understood that the specific embodiments described herein are merely illustrative of the disclosure and are not intended to limit the disclosure.

With the development of computer technology, the input method of the computer has gone through four stages e.g., original paper tape input, keyboard input, mouse input, and touch input. The above process is from a professional stage to a popular stage, and touch screen technology allows more people to use computers. A touch screen is an interactive input device in which a user can control the operation of the computer by touching a position on the touch screen by using a finger or a light pen. Therefore, the touch screen is easy to operate and can be flexibly used.

Touch screen technology is the most popular computer input mode after keyboard input, mouse input, handwriting board input, and voice input. With this technique, the user may operate the host computer by touching icons or characters on the display screen of the computer with his/her fingers so as to make the human-computer interaction more straightforward. This technology greatly facilitates the user and is an attractive new multimedia interaction device.

A main element of the touch screen is a sensor consisting of a touch detection component and a touch screen controller. A touch detection component is mounted in front of the display screen for detecting a touch position of a user and transmits the information on the touch position to the touch screen controller. The touch screen controller is mainly configured to receive touch information from the touch point detection device and convert it into touch point coordinate information to be sent to the CPU, and to receive and execute commands from the CPU.

Electronic devices such as smartphones and tablets in the market often suffer from an unexplained problem of touch failure at power-on of the electronic devices. Some of the electronic devices suffer from the above problem due to damage of the touch screen hardware and in this case, the problem cannot be addressed. Some of the electronic devices suffer from the above problem due to low-probability software problem, e.g., touch is failure after startup but becomes normal after restart, which causes very poor user experience and inconvenience to the user.

Figure 1:
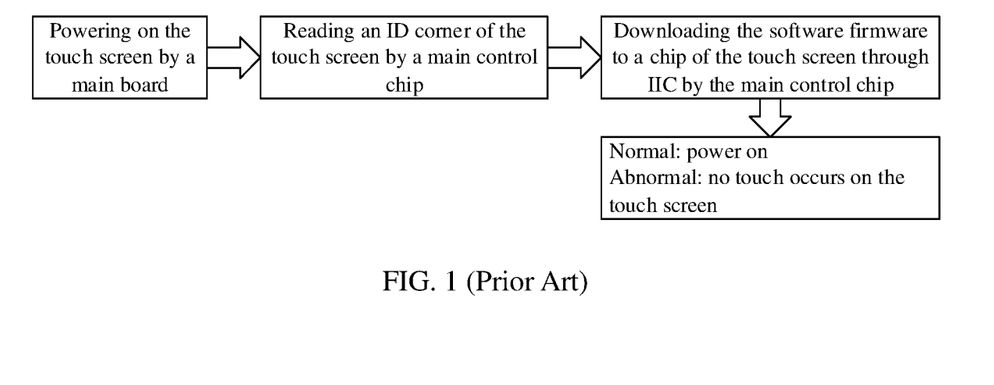
FIG. 1 is a schematic diagram of power-on of a touch screen in the related art.

As shown in FIG. 1, the touch screen is powered on by a main board. A main control chip reads an identification (ID) pin of the touch screen. The main control chip downloads the software firmware to a chip of the touch screen through an inter-integrated circuit (IIC). If the chip of the touch screen is detected and the software firmware is downloaded, the main control chip, the electronic device is powered on, and if the chip of the touch screen is not detected or the software firmware is not downloaded it means that no touch occurs on the touch screen. The IIC is a serial communication bus. With the development of large-scale integrated circuit technology, it is more convenient to integrate a CPU and peripheral circuits such as ROM, RAM, I/O port, A/D, and D/A required for a separate work system into a single chip, to form a single-chip microcomputer or a microcontroller. At present, many companies in the world produce the single-chip microcomputers in many varieties, which includes a CPU of various word lengths, a ROM of various capacities, a RAM of various capacities, an I/O interface circuit of various functions, or the like. However, the variety and the specifications of the single-chip microcomputer are still limited, so that only certain kinds of single-chip microcomputer can be used for expansion. There are two methods of expansion: a parallel bus and a serial bus. Because the serial bus has few connection lines and a simple structure, it often uses wires to directly connect various devices without using special main boards and sockets. Therefore, using serial bus can greatly simplify the hardware design of the system. PHILIPS introduced the I2C serial bus more than a decade ago, which enables functions such as decision required by a multi-host system and synchronization of high and low-speed devices. Therefore, this is a high-performance serial bus.

Figure 2:
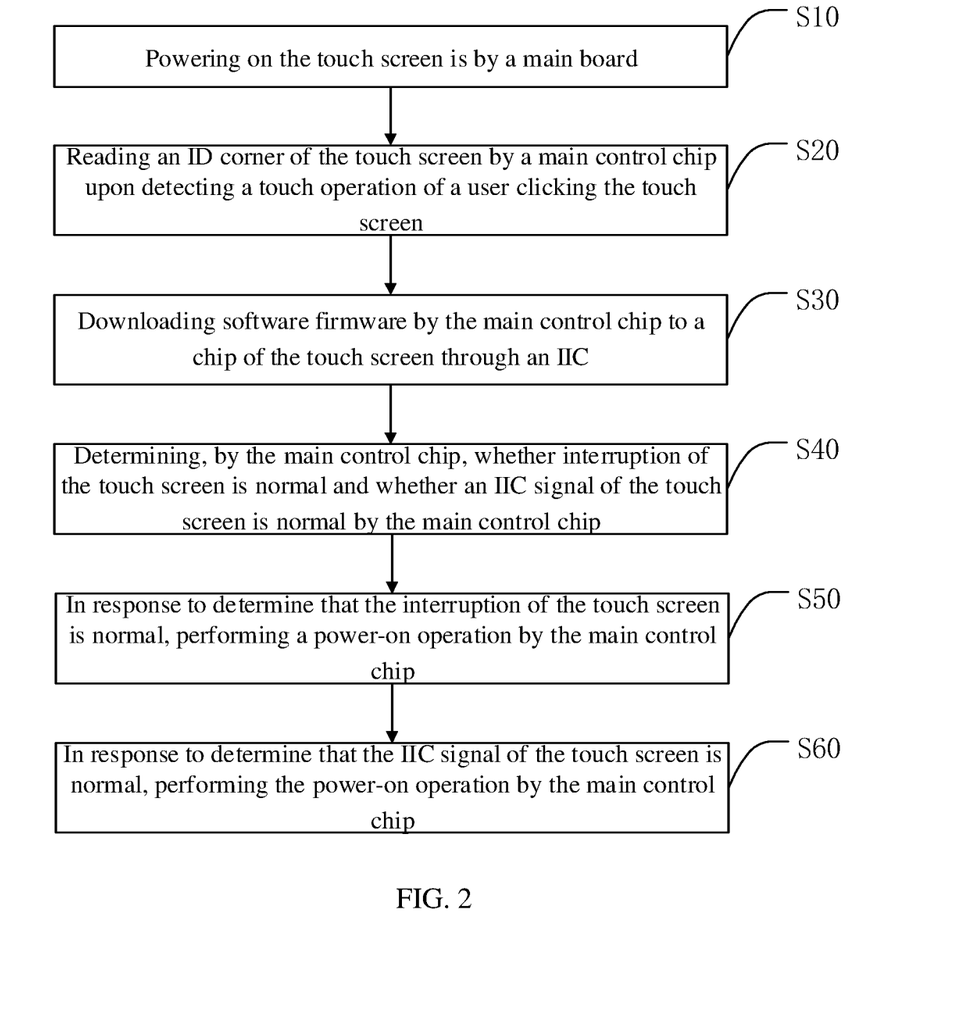
FIG. 2 is a flowchart of a method of processing touch failure of a touch screen at power-on of a touch screen according to an embodiment of the present disclosure.
Figure 3:
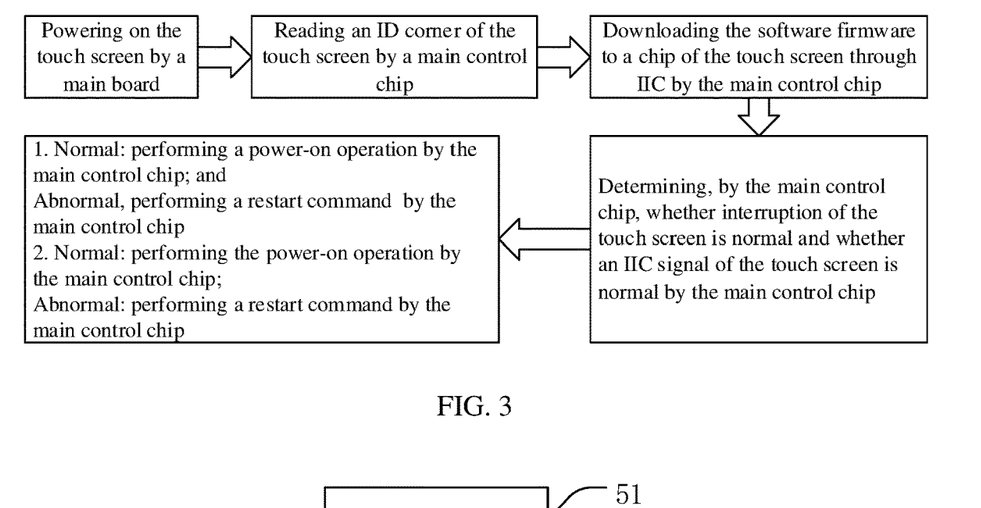
FIG. 3 is a schematic flowchart of power-on of a touch screen in a method of processing touch failure of a touch screen at power-on of a touch screen according to an embodiment of the present disclosure.

In view of the above, the method for processing touch failure at power-on of a touch screen according to an embodiment of the present disclosure includes the following steps, as shown in FIGS. 2 and 3.

At Step S10, the touch screen is powered on by a main board.

At Step S20, a main control chip reads an ID pin of the touch screen upon detecting a touch operation of the user clicking the touch screen.

At Step S30, the main control chip downloads software firmware to a chip of the touch screen through an IIC.

At Step S40, the main control chip determines whether interruption of the touch screen is normal, and determines whether an IIC signal of the touch screen is normal.

At Step S50, in response to determining that the interruption of the touch screen is normal, the main control chip performs a power-on operation.

At Step S60, in response to determining that the IIC signal of the touch screen is normal, the main control chip performs a power-on operation.

Further, the method further includes: after the step S40, the main control chip performs a restart command in response to determining that the interruption of the touch screen is abnormal. In response to determining that the interruption of the touch screen is abnormal, the number of times the main control chip performs the restart command is a preset value. The preset value may be one to two, and may be defined or set by the designer.

Further, the method further includes: after the step S40, the main control chip executes the restart command in response to determining that the IIC signal of the touch screen is abnormal. In response to determining that the IIC signal of the touch screen is abnormal, the number of times the main control chip executes the restart command is a preset value. The preset value may be one to two, and may be defined or set by the designer.

A main board, also known as a mainboard, a system board, or a main board, is one of the most basic and important component of a computer. The main board is generally a rectangular circuit board, and a main circuit system constituting the computer is mounted on the main board. The main circuit system includes components such as a BIOS chip, an I/O control chip, a keyboard and a panel control switch interface, an indicator light connector, an expansion slot, a main board, and a DC power supply connector of a card. The main board may have an open-type structure. Most of the main boards have six to fifth expansion slots for connecting control cards (adapters) of PC peripheral devices. By replacing these plug-in cards, corresponding subsystems of the microcomputer may be partially upgraded, allowing the manufacturer and the user more flexibility in configuring the machine type. In sum, the main board plays an important role in the entire microcomputer system. The type and the grade of the main board determine the type and the grade of the entire microcomputer system, and the performance of the main board affects the performance of the entire microcomputer system.

The main control chip is a core component of the main board or the hard disk, is a bridge for connecting the various devices, and is a brain that controls the operation of the devices. In the main board, two chips are the most important component. One of the two chips is the south bridge chip, which controls the expansion slot, the USB interface, the serial port, the parallel port, the 1394 interface, the VGA interface, etc., and is mainly responsible for the connection between external interfaces and an internal CPU. The other of the two chips is the north bridge chip, which controls the type and the model of the CPU, the bus frequency of the main board, the memory type, the capacity, the video card, etc. The main control chip of the main board generally refers to north and south bridge chips. The south bridge chip is responsible for communication between I/O buses, such as a PCI bus, a USB, a LAN, an ATA, a SATA, an audio controller, a keyboard controller, a real-time clock controller, an advanced power management, or the like. The north bridge chip is responsible for communicating with a CPU and controlling the memory. The north bridge chip is the most important part of the main board chipset that plays a leading role. Generally, the name of the chipset is named by the name of the north bridge chip. For example, the north bridge chip of the Intel GM45 chipset is G45, and the latest north bridge chip is the north bridge chip of the X58 series that supports a core i7 processor.

As shown in FIG. 3, the touch screen is powered on by the main board. The main control chip reads the ID pin of the touch screen. The main control chip downloads software firmware to the chip of the touch screen through the IIC. The main control chip determines whether interruption of the touch screen is normal. In response to determining that the interruption of the touch screen is normal, the main control chip performs a power-on operation. In response to determining that the interruption of the touch screen is abnormal, the main control chip performs a restart command. In response to determining that the interruption of the touch screen is abnormal, the number of times the main control chip performs the restart command is a preset value. The preset value may be one to two, and may be defined or set by the designer.

Alternatively, the touch screen is powered on by the main board. The main control chip reads the ID pin of the touch screen. The main control chip downloads software firmware to the chip of the touch screen through the IIC. The main control chip determines whether an IIC signal of the touch screen is normal. In response to determining that the IIC signal of the touch screen is normal, the main control chip performs a power-on operation. In response to determining that the IIC signal of the touch screen is abnormal, the main control chip performs a restart command. In response to determining that the IIC signal of the touch screen is abnormal, the number of times the main control chip performs the restart command is a preset value. The preset value may be one to two, and may be defined or set by the designer.

That is, when the main control chip detects the interruption of the touch screen and the IIC signal of the touch screen, the main control chip may detect the interruption and the IIC signal at the same time, or may detect one of the interruption and the IIC signal. The detection sequence is not limited. For example, the main control chip first detects the interruption of the touch screen and then detects the IIC signal of the touch screen, or first detects the IIC signal of the touch screen and then detects the interruption of the touch screen.

Firmware is a program written in an erasable programmable read only memory (EPROM) or an electrically erasable programmable read only memory (EEPROM). The firmware refers to "driver program" of a device stored inside the device. By the firmware, the operating system may implement operating actions of a specific machine according to a standard device driver. For example, optical drives, recorders, etc. all have internal firmware. The firmware is software that functions as the most basic and bottom layer of a system. In a hardware device, the firmware is the soul of the hardware device, because some hardware devices do not have other software components except the firmware, and therefore the firmware determines the function and the performance of the hardware device. The firmware is generally stored in an electrically erasable read-only memory electrically erasable programmable ROM (EEPROM) or a FLASH chip in a device, and is generally upgradable by a user through a specific refresh program. Generally, software that functions as the most basic and bottom layer of a digital product may be referred to as the firmware, such as the basic input/output system (BIOS) on a computer main board, which was previously called firmware by more professionals. Generally, the programs stored within these hardwires are not directly readable or modified by the user. In the past, it was generally not necessary to upgrade the firmware, and even if a serious Bug was found in the firmware, it was necessary for the professional to replace the original machine with the programmed chip. Early firmware chips generally adopted a ROM design, and their Firmware codes were cured during production and could not be modified by any means. As technology continues to evolve, it is urgent for users to modify the firmware to adapt to the updated hardware environment, so that rewritable programmable erasable read-only memories erasable programmable ROM (EPROM), EEPROM and flash appear. These chips are rewritable, allowing the firmware to be modified and upgraded.

In an embodiment of the present disclosure, it determines whether there is a touch failure problem after the system is powered on by detecting whether the touch screen signal is normal or not, and provides a corresponding restart instruction to the system to avoid the occurrence of the problem, thereby achieving the effect that a user does not perceive the problem.

Further, in response to determining that the interruption of the touch screen is abnormal or in response to determining that the IIC signal of the touch screen is abnormal, the user is reminded that the touch screen is inactive, is prompted whether to select to restart by the pop-up box, and a corresponding operation is made according to the operation instruction from the user. For example, if the user selects to restart according to prompt of the pop-up box, the main control chip executes the restart command. If the user selects not to restart according to the prompt of the pop-up box, no operation is performed.

In an embodiment of the present disclosure, a touch screen interruption (INT) and a IIC signal are detected by the main control chip at power-on of the main control chip. In response to determining that the determination result is normal, the main control chip executes a power-on program, and in response to determining that the determination result is abnormal, the main control chip performs a power-on restart operation, so that a low-probability power-on abnormality of the touch screen may be effectively avoided, and touch failure at power-on of the touch screen caused by a touch screen interruption or a low-probability IIC abnormality is avoided.

Further, the method of processing the touch failure of the touch screen at power-on of the touch screen according to an embodiment of the present disclosure is described below.

(1) The touch screen is powered on by a main board.

(2) A main control chip reads an ID pin of the touch screen upon detecting a touch operation of the user clicking the touch screen.

(3) The main control chip downloads software firmware to the chip of the touch screen through an IIC.

(4) The main control chip determines whether interruption of the touch screen is normal, and determines whether an IIC signal of the touch screen is normal.

(5) In response to determining that the interruption of the touch screen is normal, the main control chip performs a power-on operation.

(6) In response to determining that the interruption of the touch screen is abnormal, the main control chip performs a restart command.

(7) In response to determining that the IIC signal of the touch screen is normal, the main control chip performs a power-on operation.

(8) In response to determining that the IIC signal of the touch screen is abnormal, the main control chip performs a restart command.

Figure 4:
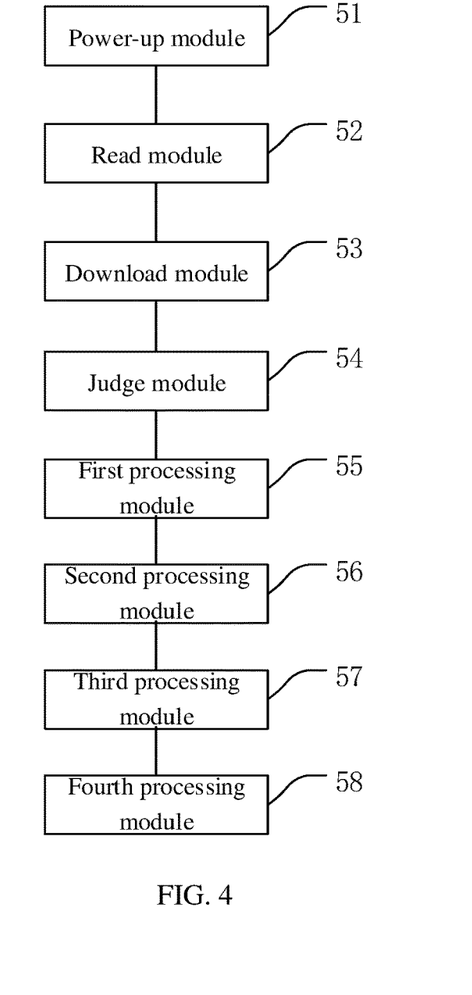
FIG. 4 is a schematic diagram of a system of processing touch failure of a touch screen at power-on of a touch screen according to an embodiment of the present disclosure.

Further, as shown in FIG. 4, based on the method of processing the touch failure of the touch screen at power-on of the touch screen, an embodiment of the present disclosure further provides a system of processing the touch failure of the touch screen at power-on of the touch screen. The system of processing the touch failure at power-on of the touch screen includes:

a power-up module 51 is configured for a main board to power on the touch screen;

a read module 52 is configured for a main control chip to read an ID pin of the touch screen upon detecting a touch operation of the user clicking the touch screen;

a download module 53 is configured for the main control chip to download software firmware to the chip of the touch screen through an IIC;

a judge module 54 is configured for the main control chip to determine whether interruption of the touch screen is normal, and determines whether an IIC signal of the touch screen is normal;

a first processing module 55 is configured for the main control chip to perform a power-on operation in response to determining that the interruption of the touch screen is normal;

a second processing module 56 is configured for the main control chip to perform a restart command in response to determining that the interruption of the touch screen is abnormal;

a third processing module 57 is configured for the main control chip to perform a power-on operation in response to determining that the IIC signal of the touch screen is normal; and a fourth processing module 58 is configured for the main control chip to perform a restart command in response to determining that the IIC signal of the touch screen is abnormal.

In an embodiment of the present disclosure, a touch screen interruption (INT) and a IIC signal are detected by the main control chip at power-on of the main control chip. The INT and the IIC signal may be detected simultaneously or one by one. In response to determining that the determination result is normal, the main control chip executes a power-on program, and in response to determining that the determination result is abnormal, the main control chip performs a power-on restart operation, so that a low-probability power-on abnormality of the touch screen may be effectively avoided, and the touch failure at power-on of the touch screen caused by a touch screen interruption or a low-probability IIC abnormality is avoided.

Figure 5:
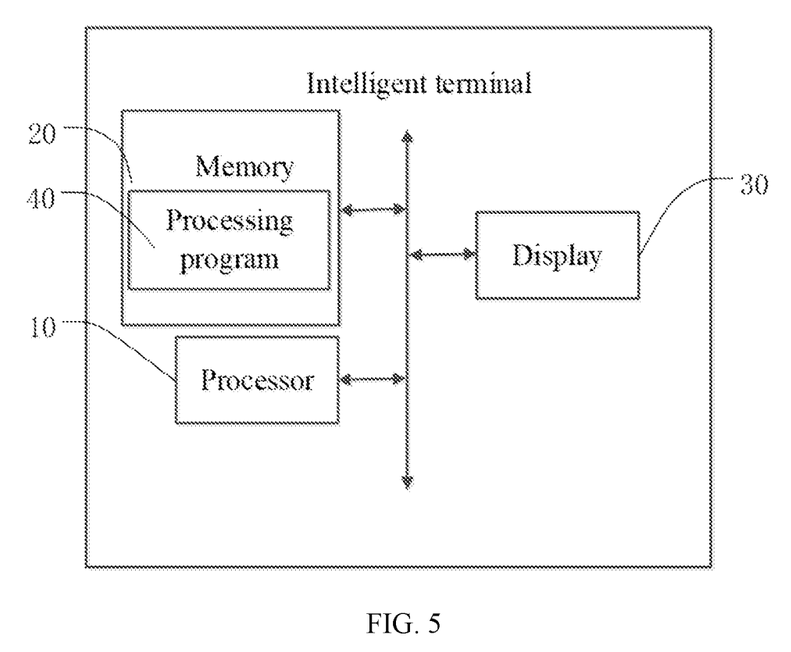
FIG. 5 is a schematic diagram of the operation environment of an intelligent terminal according to an embodiment of the present disclosure.

Further, as shown in FIG. 5, based on the method and the system of processing the touch failure of the touch screen at power-on of the touch screen, an embodiment of the present disclosure further provides an intelligent terminal including a processor 10, a memory 20, and a display 30. FIG. 5 illustrates only some of the components of the intelligent terminal, but it is to be understood that not all of the illustrated components is required to be implemented, and that more or fewer components may alternatively be implemented.

In some embodiments, the memory 20 may be an internal storage unit of the intelligent terminal, such as a memory of the intelligent terminal. In other embodiments, the memory 20 may further be an external storage device of the intelligent terminal, such as a plug-in USB disk provided on the intelligent terminal, a smart media card (SMC), a secure digital (SD) card, a flash card, etc. Further, the memory 20 may further include both an internal storage unit and an external storage device of the intelligent terminal. The memory 20 is configured to store application software installed on the intelligent terminal and various types of data, such as program code for installing the intelligent terminal. The memory 20 may further be configured to temporarily store data that has been or is to be output. In one embodiment, the memory 20 stores hereon processing program 40 for processing the touch failure of the touch screen at power-on of the touch screen, which may be executed by the processor 10 to implement the method of processing the touch failure of the touch screen at power-on of the touch screen in the present application.

In some embodiments, the processor 10 may be a central processing unit (CPU), microprocessor, handset baseband processor, or other data processing chip, and configured to run program code or processing data stored in the memory 20, such as the method of processing the touch failure of the touch screen at power-on of the touch screen.

In some embodiments, the display 30 may be, an LED display, a liquid crystal display, a touch-sensitive liquid crystal display, an organic light-emitting diode (OLED) touch, or the like. The display 30 is configured to display information on the intelligent terminal and to display a visualization user interface. The components 10 to 30 of the intelligent terminal communicate with each other through a system bus.

In an embodiment, the following steps are implemented when the processor 10 executes the processing program 40 for processing the touch failure of the touch screen at power-on of the touch screen in the memory 20:

The touch screen is powered on by a main board.

A main control chip reads an ID pin of the touch screen upon detecting a touch operation of the user clicking the touch screen.

The main control chip downloads software firmware to the chip of the touch screen through an IIC.

The main control chip determines whether interruption of the touch screen is normal, and determines whether an IIC signal of the touch screen is normal.

In response to determining that the interruption of the touch screen is normal, the main control chip performs a power-on operation.

In response to determining that the IIC signal of the touch screen is normal, the main control chip performs a power-on operation.

The steps further include: after the main control chip determines whether interruption of the touch screen is normal, in response to determining that the interruption of the touch screen is abnormal, the main control chip performs a restart command.

The steps further include: after the main control chip determines whether the IIC signal of the touch screen is normal, in response to determining that the IIC signal of the touch screen is abnormal, the main control chip performs a restart command.

The method of processing the touch failure of the touch screen at power-on of the touch screen further includes:

in response to determining that the interruption of the touch screen is abnormal, the number of times the main control chip executes the restart command is a preset value.

The method of processing the touch failure of the touch screen at power-on of the touch screen further includes:

In response to determining that the IIC signal of the touch screen is normal, the main control chip performs a power-on operation.

the preset value may be one to two.

An embodiment of the present application is directed to a computer readable storage medium having stored thereon a computer program for processing the touch failure of the touch screen at power-on of the touch screen executable by a processor, to perform the steps in any of the methods of for processing the touch failure of the touch screen at power-on of the touch screen according to embodiments of the present disclosure.

In summary, embodiments of the present disclosure provide a method, a system, an intelligent terminal, and a computer-readable storage medium of processing the touch failure of the touch screen at power-on of the touch screen. The method includes: powering on the touch screen by a main board; reading an ID pin of the touch screen by a main control chip upon detecting a touch operation of the user clicking the touch screen; downloading software firmware by the main control chip to the chip of the touch screen through an IIC; determining, by the main control chip, whether interruption of the touch screen is normal and determining, by the main control chip, whether an IIC signal of the touch screen is normal by the main control chip; in response to determining that the interruption of the touch screen is normal, performing a power-on operation by the main control chip; in response to determining that the interruption of the touch screen is abnormal, performing a restart command by the main control chip; in response to determining that the IIC signal of the touch screen is normal, performing a power-on operation by the main control chip; in response to determining that the IIC signal of the touch screen is abnormal, performing a restart command by the main control chip. In an embodiment of the present disclosure, a touch screen interruption (INT) and a IIC signal are detected by the main control chip at power-on of the main control chip. In response to determining that the determination result is normal, the main control chip executes a power-on program, and in response to determining that the determination result is abnormal, the main control chip performs a power-on restart operation, so that a low-probability power-on abnormality of the touch screen may be effectively avoided, and the touch failure at power-on of the touch screen caused by a touch screen interruption or a low-probability IIC abnormality is avoided.

It should be noted that, in this application, the terms "comprise/include" "comprising/including" or any other variation thereof, are intended to encompass a non-exclusive inclusion, such that a process, method, object, or intelligent terminal that includes a list of elements includes not only those elements but also other elements not expressly listed, or elements inherent to such process, method, object, or intelligent terminal. Unless being further defined, an element defined by the statement "includes a . . . " does not exclude the presence of other identical elements in the process, method, object or intelligent terminal that includes the element.

A person of ordinary skill in the art may understand that all or parts of the processes for implementing the methods in the above-described embodiments may be implemented by instructing relevant hardware (e.g., a processor, a controller, etc.) by a computer program. The computer program may be stored in a non-volatile computer readable storage medium, and the computer program may, when executed, include the processes of the embodiments of the methods described above. The computer readable storage medium may be a memory, a magnetic disk, an optical disk, or the like.

It may be understood the application of the present application is not limited to the above examples, and that for those of ordinary skill in the art, equivalent replacements or changes may be made in light of the above description, and all these changes or replacements should belong to the protection scope of the appended claims of the present application.

What is claimed is:

1. A method of processing touch failure of a touch screen at power-on of a touch screen, comprising:
   powering on the touch screen is by a main board;
   reading an ID pin of the touch screen by a main control chip upon detecting a touch operation of a user clicking the touch screen;
   downloading software firmware by the main control chip to a chip of the touch screen through an inter-integrated circuit (IIC);
   determining, by the main control chip, whether interruption of the touch screen is normal and whether an IIC signal of the touch screen is normal by the main control chip;
   in response to determine that the interruption of the touch screen is normal, performing a power-on operation by the main control chip; and
   in response to determine that the IIC signal of the touch screen is normal, performing the power-on operation by the main control chip.

2. The method of claim 1, further comprising: after determining, by the main control chip, whether the interruption of the touch screen is normal,
   in response to determine that the interruption of the touch screen is abnormal, the main control chip performs a restart command.

3. The method of claim 1, further comprising: after determining, by the main control chip, whether the IIC signal of the touch screen is normal,
   in response to determine that the IIC signal of the touch screen is abnormal, the main control chip performs a restart command.

4. The method of claim 2, further comprising:
   in response to determine that the interruption of the touch screen is abnormal, the number of times the main control chip executes the restart command is a preset value.

5. The method of claim 3, further comprising:
   in response to determine that the IIC signal of the touch screen is abnormal, the number of times the main control chip executes the restart command is a preset value.

6. The method of claim 4, wherein the preset value is one to two.

7. The method of claim 1, further comprising:
   in response to determine that the interruption of the touch screen is abnormal or in response to determine that the IIC signal of the touch screen is abnormal, reminding the user that the touch screen is inactive, prompting, by a pop-up box, the user whether to restart, and performing operations according to the user's operation instructions.

8. An intelligent terminal comprising a memory, a processor, and processing program, for processing touch failure of a touch screen at power-on of a touch screen, stored on the memory and run on the processor, wherein the processing program is executed by the processor to perform operations comprising:
   powering on the touch screen is by a main board;
   reading an ID pin of the touch screen by a main control chip upon detecting a touch operation of the user clicking the touch screen;
   downloading software firmware by the main control chip to a chip of the touch screen through an IIC;
   determining, by the main control chip, whether interruption of the touch screen is normal and whether an IIC signal of the touch screen is normal by the main control chip;
   in response to determine that the interruption of the touch screen is normal, performing a power-on operation by the main control chip; and
   in response to determine that the IIC signal of the touch screen is normal, performing a power-on operation by the main control chip.

9. The intelligent terminal of claim 8, wherein the processing program is executed by the processor to perform operations further comprising: after determining, by the main control chip, whether the interruption of the touch screen is normal,
   in response to determine that the interruption of the touch screen is abnormal, the main control chip performs a restart command.

10. The intelligent terminal of claim 8, wherein the processing program is executed by the processor to perform operations further comprising: after determining, by the main control chip, whether the IIC signal of the touch screen is normal,
    in response to determine that the IIC signal of the touch screen is abnormal, the main control chip performs a restart command.

11. The intelligent terminal of claim 9, wherein the processing program is executed by the processor to perform operations further comprising:
    in response to determine that the interruption of the touch screen is abnormal, the number of times the main control chip executes the restart command is a preset value.

12. The intelligent terminal of claim 10, wherein the processing program is executed by the processor to perform operations further comprising:
    in response to determine that the IIC signal of the touch screen is abnormal, the number of times the main control chip executes the restart command is a preset value.

13. The intelligent terminal of claim 8, wherein the processing program is executed by the processor to perform operations further comprising:
    in response to determine that the interruption of the touch screen is abnormal or in response to determine that the IIC signal of the touch screen is abnormal, reminding the user that the touch screen is inactive, prompting, by a pop-up box, the user whether to restart, and performing operations according to the user's operation instructions.

14. A computer readable storage medium having stored thereon a computer program for processing the touch failure of the touch screen at power-on of the touch screen executable by a processor, to perform operations comprising:
    powering on the touch screen is by a main board;
    reading an ID pin of the touch screen by a main control chip upon detecting a touch operation of the user clicking the touch screen;
    downloading software firmware by the main control chip to a chip of the touch screen through an IIC;

determining, by the main control chip, whether interruption of the touch screen is normal and whether an IIC signal of the touch screen is normal by the main control chip;

in response to determine that the interruption of the touch screen is normal, performing a power-on operation by the main control chip; and in response to determine that the IIC signal of the touch screen is normal, performing a power-on operation by the main control chip.

15. The computer readable storage medium of claim 14, wherein the processing program is executed by the processor to perform operations further comprising: after determining, by the main control chip, whether the interruption of the touch screen is normal, in response to determine that the interruption of the touch screen is abnormal, the main control chip performs a restart command.

16. The computer readable storage medium of claim 15, wherein the processing program is executed by the processor to perform operations further comprising: after determining, by the main control chip, whether the IIC signal of the touch screen is normal, in response to determine that the IIC signal of the touch screen is abnormal, the main control chip performs a restart command.

17. The computer readable storage medium of claim 15, wherein the processing program is executed by the processor to perform operations further comprising:

in response to determine that the interruption of the touch screen is abnormal, the number of times the main control chip executes the restart command is a preset value.

18. The computer readable storage medium of claim 16, wherein the processing program is executed by the processor to perform operations further comprising:

in response to determine that the IIC signal of the touch screen is abnormal, the number of times the main control chip executes the restart command is a preset value.

19. The computer readable storage medium of claim 14, wherein the processing program is executed by the processor to perform operations further comprising:

in response to determine that the interruption of the touch screen is abnormal or in response to determine that the IIC signal of the touch screen is abnormal, reminding the user that the touch screen is inactive, prompting, by a pop-up box, the user whether to restart, and performing operations according to the user's operation instructions.

20. The method of claim 5, wherein the preset value is one to two.

* * * * *